United States Patent
Woodhouse et al.

(10) Patent No.: US 10,059,205 B2
(45) Date of Patent: Aug. 28, 2018

(54) CENTER STACK MODULE

(71) Applicant: Ford Global Technologies, LLC, Dearborn, MI (US)

(72) Inventors: David Woodhouse, Troy, MI (US); Soo Young Kang-Morales, Northville, MI (US); Ryan G. Niemiec, Northville, MI (US); Ryan Blodi, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 15/450,069

(22) Filed: Mar. 6, 2017

(65) Prior Publication Data

US 2017/0274773 A1 Sep. 28, 2017

Related U.S. Application Data

(60) Provisional application No. 62/312,274, filed on Mar. 23, 2016.

(51) Int. Cl.
*B60K 37/04* (2006.01)
*B60K 35/00* (2006.01)
*B60R 16/02* (2006.01)

(52) U.S. Cl.
CPC ............. *B60K 35/00* (2013.01); *B60K 37/04* (2013.01); *B60R 16/02* (2013.01); *B60K 2350/106* (2013.01); *B60K 2350/1008* (2013.01); *B60K 2350/2013* (2013.01); *B60K 2350/40* (2013.01); *B60K 2350/401* (2013.01); *B60K 2350/925* (2013.01)

(58) Field of Classification Search
CPC ............ B60K 2350/2013; B60K 35/00; B60R 2011/0082; B60H 1/00985
USPC .................................................. 296/70, 37.12
See application file for complete search history.

(56) References Cited

U.S. PATENT DOCUMENTS

| | | | | |
|---|---|---|---|---|
| 4,022,599 A * | 5/1977 | Wilson | ............... | B60H 1/00042 165/41 |
| 6,123,377 A | 9/2000 | Lecher et al. | | |
| 6,176,534 B1 | 1/2001 | Duncan | | |
| 6,715,814 B1 * | 4/2004 | Hoyle | .................. | B60H 1/0055 296/208 |
| 7,489,303 B1 * | 2/2009 | Pryor | ..................... | B60K 35/00 345/173 |
| 7,543,871 B2 * | 6/2009 | Quigley | .................. | B60R 11/02 296/24.34 |

(Continued)

FOREIGN PATENT DOCUMENTS

DE 102016220671 A1 * 6/2017 ........... B60H 1/3421

*Primary Examiner* — Pinel E Romain
(74) *Attorney, Agent, or Firm* — Vichit Chea; Price Heneveld LLP

(57) ABSTRACT

A vehicle instrument panel module is provided herein. The module includes a display portion including a display. A transition portion is disposed along a bottom section of the display portion. A register portion is disposed below the transition portion and has one or more airflow registers therein. The display portion, the transition portion, and the register portion each have at least one component that is integrally formed with the remaining portions of the module. A first electrical connector housing is formed with the module and configured to mate with a second electrical connector disposed within the vehicle.

20 Claims, 9 Drawing Sheets

(56) References Cited

U.S. PATENT DOCUMENTS

| | | | |
|---|---|---|---|
| 8,002,179 B2* | 8/2011 | Feit | B60K 35/00 |
| | | | 235/382 |
| 9,002,549 B2* | 4/2015 | Obradovich | B60G 17/0195 |
| | | | 340/988 |
| 9,126,483 B2* | 9/2015 | Aoki | B60K 37/02 |
| 9,233,649 B2* | 1/2016 | Bisceglia | B60R 11/02 |
| 2003/0128103 A1 | 7/2003 | Fitzpatrick et al. | |
| 2016/0159292 A1* | 6/2016 | Wall | B60K 35/00 |
| | | | 296/37.12 |
| 2017/0120724 A1* | 5/2017 | Furse | B60H 1/00985 |

* cited by examiner

CENTER STACK MODULE

CROSS-REFERENCE TO RELATED APPLICATION

This application claims benefit from U.S. Provisional Patent Application No. 62/312,274, which was filed on Mar. 23, 2016, entitled "CENTER STACK MODULE," the entire disclosure of which is hereby incorporated herein by reference.

FIELD OF THE INVENTION

The present disclosure generally relates to a center stack for a vehicle, and more particularly relates to a center stack display having a bezel.

BACKGROUND OF THE INVENTION

Automotive vehicles commonly incorporate displays within the vehicle. It is therefore desired to implement unique and appealing displays to offer an attractive viewing experience.

SUMMARY OF THE INVENTION

According to one aspect of the present disclosure, a vehicle instrument panel module is disclosed. The module includes a display portion including a display. A transition portion is disposed along a bottom section of the display portion. A register portion is disposed below the transition portion and has one or more airflow registers therein. The display portion, the transition portion, and the register portion each have at least one component that is integrally formed with the remaining portions of the module. A first electrical connector housing is formed with the module and configured to mate with a second electrical connector disposed within the vehicle.

According to another aspect of the present disclosure, a bezel housing for a center stack module is disclosed. The housing includes a first portion that encompasses a display that extends upwardly from an instrument panel. A second portion has a first radius, wherein the first radius has a curvature in a first direction. A third portion has a second radius that has a curvature in a second direction. The first, second, and third portions of said bezel are formed as an integral vehicle component.

According to a further aspect of the present disclosure, a module for a vehicle is disclosed. The module includes a display portion surrounding a portion of a display. A transition portion is disposed below the display portion. A register portion is disposed below the transition portion and includes one or more airflow registers therein. The display portion, the transition portion, and the register portion are integrally formed as a bezel.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
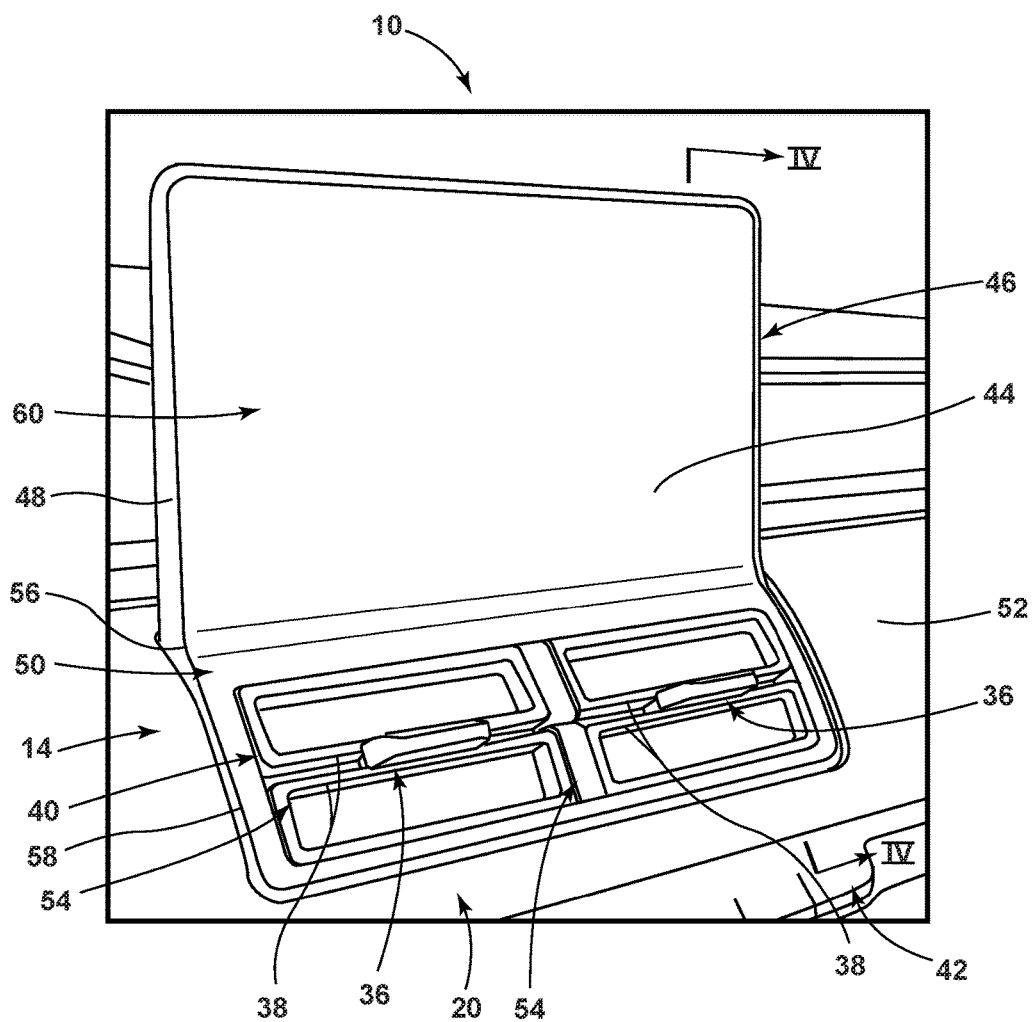
FIG. 2 is front perspective view of a module disposed on a center portion of the instrument panel, according to one embodiment.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an integrally formed module that includes a display, a bezel, and an HVAC (heating, ventilating, and air conditioning) register. The integrally formed module may be disposed on and/or within an instrument panel of a vehicle as a single component.

Figure 1:
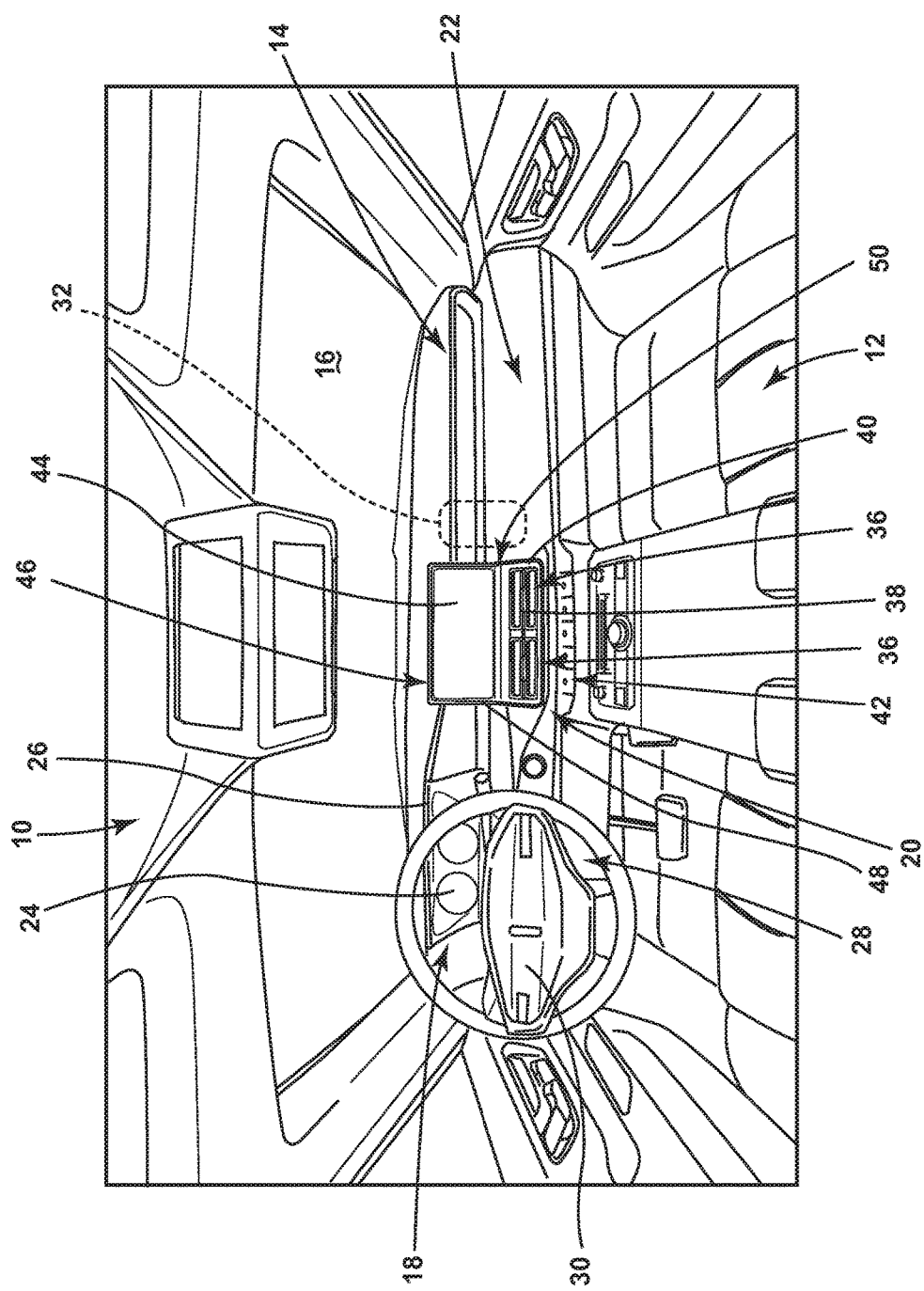
FIG. 1 is a perspective view of a vehicular instrument panel within a vehicle cabin, according to one embodiment.

Referring to FIG. 1, a vehicle 10 having an interior cabin 12 is illustrated. An instrument panel 14 is disposed vehicle forward within the cabin 12 and proximately to a windshield 16, among other vehicle components. The instrument panel 14 extends cross-car within the cabin 12 and may include a driver-side portion 18, a center portion 20, and a passenger-side portion 22.

The driver-side portion 18 of the instrument panel 14 includes an instrument cluster 24 covered by an instrument cluster hood 26. A steering column 28 is located below the instrument cluster 24. The steering column 28 may be supported by the instrument panel 14 and engages a steering system (not shown) vehicle forward of the instrument panel 14. The steering column 28 extends from the steering system into the cabin 12 through, or below, the instrument panel 14. The steering column 28 has a steering wheel 30 disposed at one end thereof.

The vehicle 10 may also include an HVAC system 32 that includes components, such as the common components of the refrigeration cycle and a fan, disposed vehicle forward of the instrument panel 14. The HVAC system 32 includes an air duct assembly 34 (FIG. 4) that may be configured to control and/or direct the flow of air into the cabin 12 of the vehicle 10. The flow of air may be directed through one or more registers 36 and into the cabin 12. The registers 36 may include one or more vanes 38, 62 (FIG. 4) to direct the flow of air in a desired direction.

As illustrated in FIG. 1, the one or more of the registers 36 may have a substantially rectangular hollow housing 40 and a one or more aforementioned vanes 38 therein. While the register housing 40 is illustrated having a rectangular configuration, any other configuration, such as circular or oval configurations, may be utilized without departing from the teachings provided herein.

With further reference to FIG. 1, the center portion 20 of the instrument panel 14 may include a plurality of controls 42 that are accessible to an occupant of the vehicle 10 to adjust a number of user options and/or settings. The controls 42 may be utilized in conjunction with a display 44. The display 44 may provide a wide range of information, settings, preferences, controls, etc., to an occupant of the vehicle 10.

Figure 3:
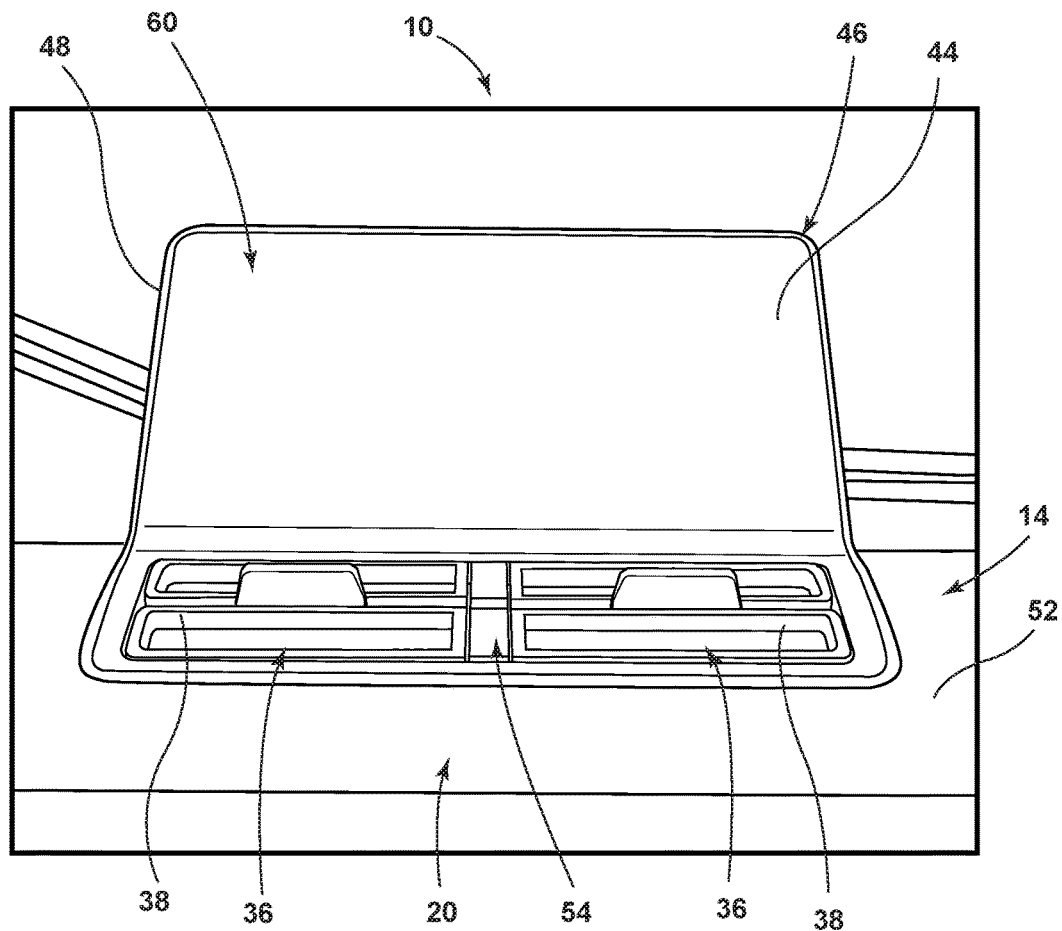
FIG. 3 is a bottom perspective view of the module according to the embodiment of FIG. 2 having a register portion disposed below a transition portion of the module.

Referring to FIGS. 2-3, an integrally formed module 46 may form a display portion 60 (or first portion), which may include a bezel 48 encompassing the display 44, a transition portion 50 (or second portion), and a register portion 54 (or third portion), which includes the one or more registers 36, disposed between the display portion 60 and the register portion 54 such that the display 44 and one or more registers 36 may be configured as a single, pre-assembled module 46. According to one embodiment, the bezel 48 is contiguous such that the bezel 48 encompasses at least a portion of the display 44, the transition portion 50, and the register portion 54.

The module 46 may be partially disposed within and/or mounted adjacently to an A-surface material 52, such as a skin or top layer of material, of the instrument panel 14. The module 46 may be coupled to an instrument panel substrate that is concealed by the A-surface. The coupling of the module 46 to the substrate may allow for the module 46 to support the display 44 of the module 46 in an upright manner. According to one embodiment, the bezel 48 surrounding a substantial portion (e.g., greater than 50%) of the display 44 is free from contact with any other component of the vehicle 10, other than the transition portion 50.

The A-surface or visible surface of the module 46 may be specifically designed surface for presenting a finished appearance to the vehicle occupant. The A-surface can include any number of finished surfaces, such as textured or smooth finishes, as dictated by the overall vehicle interior design. The display portion 60, the transition portion 50, and the register portion 54 of the module 46 may be made of any suitable material, such as a polymeric material, a metallic material, a glass material, an elastomeric material and/or any combination thereof. The B-surface, or non-visible surface once installed within the vehicle 10, is a more engineered surface, having structural supports, various attachment mechanisms, and locator tabs disposed thereon, as further described below.

The display portion 60 may include the display 44 and a portion of the bezel 48. The display 44 generally presents information to the occupants of the vehicle 10, such as time of day, current location, current vehicle system settings, and the like. The display 44 may be configured as a light-emitting diode (LED) display, organic LED (OLED) display, light emitting polymer (LEP) display or polymer LED (PLED) display, liquid crystal display (LCD), thin film transistor (TFT) LCD display, LED side-lit or back-lit LCD display, any other form of display, and/or combinations thereof. In some embodiments, the display 44 may possess a square or a rectangular aspect ratio, which may be viewed in either a landscape or a portrait orientation. In other embodiments, the display 44 may have a round, circular, or oval shape.

With further reference to FIGS. 2-3, the transition portion 50 is disposed between the display portion 60 and the register portion 54. The transition portion 50 may be radiused 56 in a first direction that is opposite the radiused direction 58 of the register portion 54. In any event, the transition portion 50 is configured to support the display portion 60 in a vertical orientation, or any other desired orientation. The transition portion 50 may have any desired appearance. According to one embodiment, the display portion 60, the transition portion 50, and the A-surface of the register portion 54 may be made of a common material and/or all have a common surface finish, color, and/or design. In alternate embodiments, however, any and/or all of the portions of the module 46 may vary in finish, color, and/or design.

Figure 4:
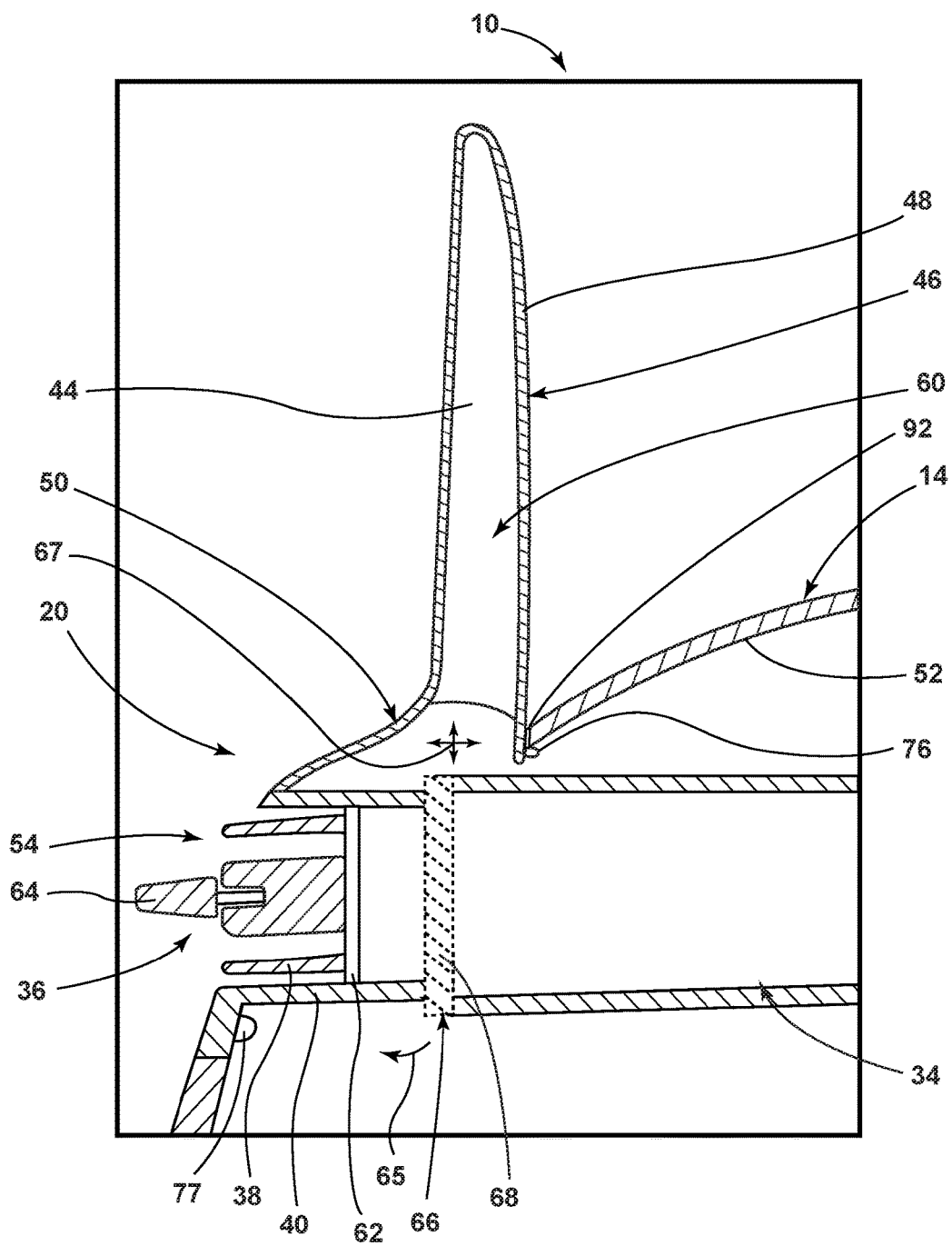
FIG. 4 is a cross-sectional view of the module taken along the line IV-IV of FIG. 2, according to one embodiment, illustrating the module coupled to an air duct disposed vehicle forward of the module.

Referring to FIG. 4, each register 36 is provided with one or more horizontally oriented vanes 38 and may further include one or more vertically oriented vanes 62. Each of the plurality of horizontally oriented vanes 38 is mechanically coupled one to the other by a first linkage that connects to a register control tab 64, and each of the vertically oriented vanes 62 is mechanically coupled one to the other by a second linkage that also connects to the control tab 64.

Thus, the horizontally oriented vanes 38 and the vertically oriented vanes 62 may be adjusted from side-to-side and/or up and down, respectively, in unison to direct airflow as desired by a vehicle occupant. This provides the optimal register 36 function of maximum directional range to the airflow, ideally, where the airflow is capable of being aimed between included angles ranging above an occupant's head down to the lap vertically and off the left side of the body to off the right side of the body horizontally.

With further reference to FIG. 4, each register 36 may independently couple to an internal HVAC duct 34 that is configured to distribute airflow through the registers 36. Each register 36 may removably couple to the duct 34 through a male-female connection 66. A foam member 68 may encompass an outer surface of an inner portion of the register 36 and assist in forming a tight fit between the duct 34 and the register 36. Furthermore, the coupling of each register 36 to the duct 34 may provide support against torsional force 65 and/or linear force 67 thereby assisting in the prevention of movement of the module 46, or portion thereof, when the vehicle 10 is in motion and/or when contact is made with the module 46. For example, as a user makes contact with the display 44, the torsional force 65 may be forced onto the module 46. This torsional force 65 may be counteracted through the combination of fasteners, clips 76, and/or the coupling of the registers 36 to the duct 34. A noise, vibration, and/or harshness (NVH) material 92 may be disposed between the instrument panel 14 and the module 46 when the module is installed within the vehicle 10. The NVH material 92 may be any component known in the art, including but not limited to, a fibrous tape.

Figure 5:
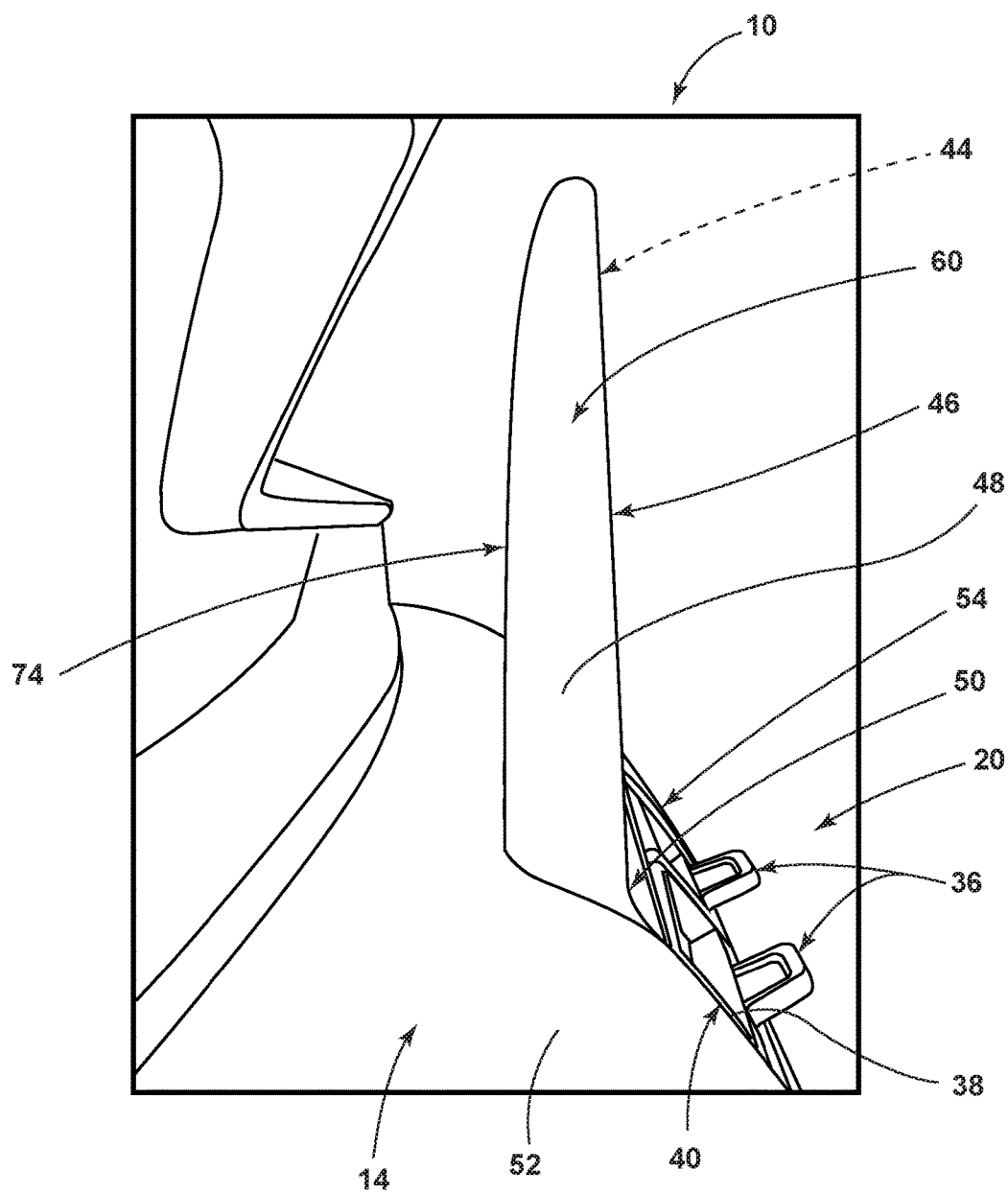
FIG. 5 is a first side perspective view of the module according to the embodiment of FIG. 2 illustrating a display portion of the module extending upwardly above a surface of the instrument panel.
Figure 6:
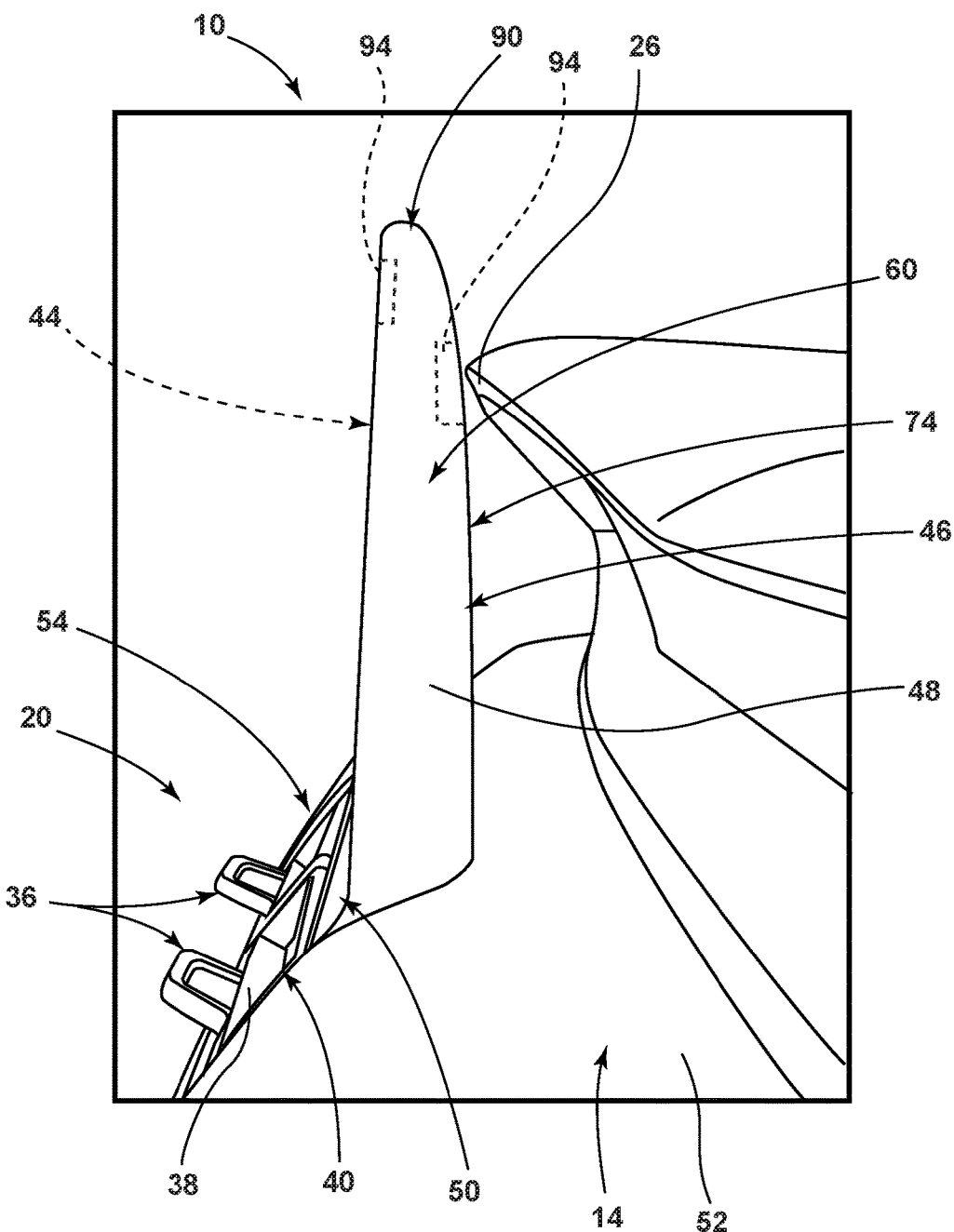
FIG. 6 is a second side perspective view of the module according to the embodiment of FIG. 2 illustrating the display portion of the module extending upwardly above a surface of the instrument panel.
Figure 7:
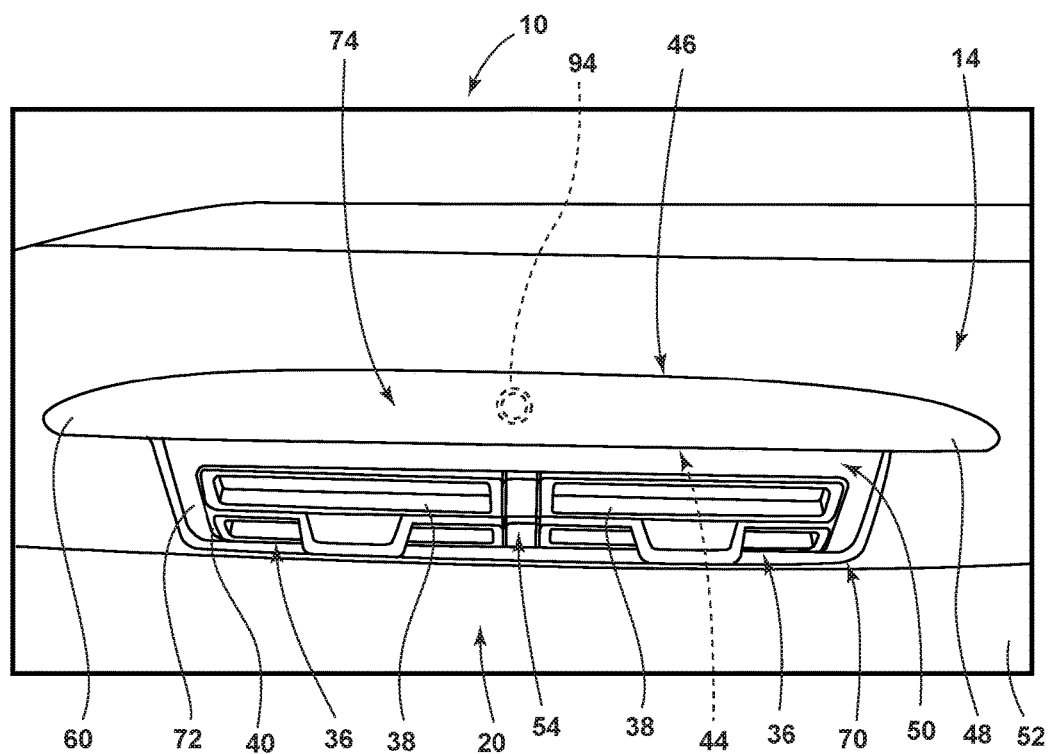
FIG. 7 is a top perspective view of the module according to the embodiment of FIG. 2.

Referring to FIGS. 5-7, the module 46 is fixedly attached to the central portion 20 of the instrument panel 14 as a preassembled component that includes the display 44 with a bezel 48 surrounding a portion thereof, a transition portion 50, and one or more registers 36. Alternatively, in some embodiments, the module 46 may be an integral part of the instrument panel 14.

The bezel 48 may be positioned around a portion of the module 46 and may generally cover the perimeter edges and/or vehicle forward surface 74 of the display 44 or encircle any other portion of the display 44. The bezel 48 may substantially match the contours of the display 44 and have radiused corners 90. The bezel 48 may also extend downwardly from the display 44 and cover portions of the transition portion 50. Furthermore, the bezel 48 may extend downwardly from the transition portion 50 and encircle a side portion and/or a bottom portion of the register portion 54 of the module 46.

According to one embodiment, the bezel 48 is of a two-piece construction and includes a perimeter portion 70 and a front portion 72. The perimeter portion 70 may encompass a substantial portion of the perimeter of the module 46, and the components that are included within the module 46. The perimeter portion 70 may also cover a vehicle forward surface 74 of the display 44. The front portion 72 may face vehicle rearward and may be attached to a vehicle rearward surface of the module 46. According to one embodiment, the perimeter portion 70 and the front portion 72 are integrally formed as a single component. In alternate embodiments, the perimeter portion 70 may be formed from a first material while the front portion 72 is formed from a second material. Alternatively still, the front portion 72 and perimeter portion 70 may be formed from a common material but include varying finishing effects and/or include varying coloring pigments and may be later attached to one another.

According to one embodiment, additional components may be disposed within the module 46. For example, according to one embodiment, a camera 94 may be mounted within the bezel 48 of the module 46. The camera 94 may face vehicle rearwardly (i.e., into the cabin 12). Alternatively, the camera 94 may be disposed on a vehicle forward portion of the bezel 48 to monitor objects forwardly of the vehicle 10 in embodiments where a portion of the bezel 48 extends above the remaining vehicle forward portions of the instrument panel 14. Alternatively still, a first camera 94 may face vehicle rearwardly while a second camera 94 images objects forwardly of the vehicle 10 from an opposing side of the module 46. It will be appreciated that any other component may also be integrally disposed within the module 46 in conjunction with a camera 94, or instead of a camera 94, without departing from the teachings provided herein.

Figure 8:
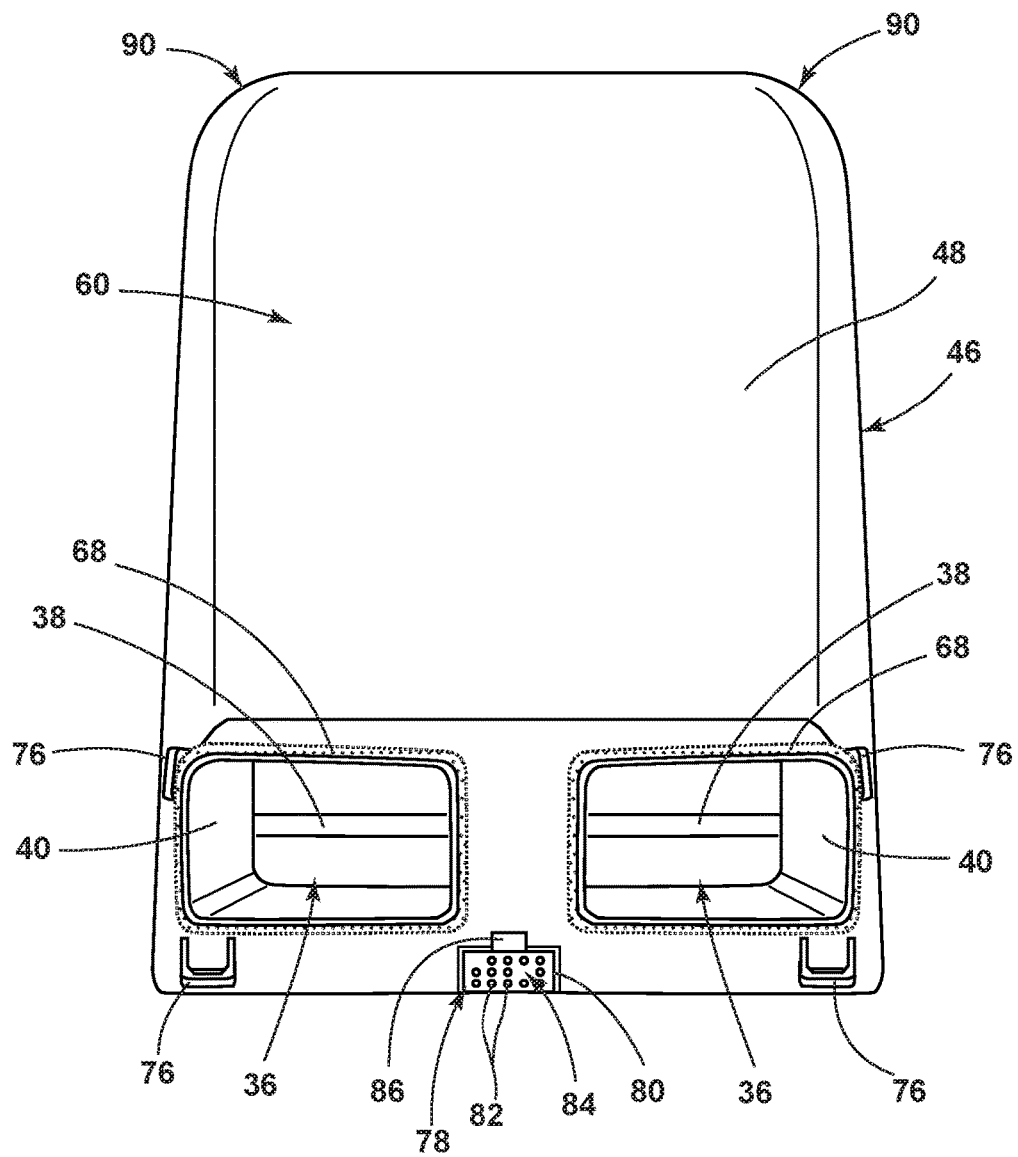
FIG. 8 is a rear perspective view of the module according to the embodiment of FIG. 2.

Referring to FIG. 8, the module 46 may include clips or attachment components, which may be used to secure the module 46 to the vehicle instrument panel substrate. The clips may be integrally formed with the module 46, or attached to an insertion rib 76. The insertion rib may be configured to have a clip attached thereto. Any practicable clip or fastener may be used without departing from the teachings provided herein. The clip and insertion rib 76 may be disposed through a corresponding insertion void (not shown) within the instrument panel 14 to removably couple the module 46 to the instrument panel 14 (FIG. 4).

The module 46 may further include a mateable electrical connector 78. The electrical connector 78 may include a first dielectric housing 80 and a plurality of first electrical contacts 82 disposed within a cavity 84 defined by the housing 80. A second electrical connector disposed within the vehicle 10 (FIG. 1) may also include a plurality of electrical contacts 82 and may be configured for mating with the first electrical contacts 82 to provide electrical connection between the first electrical contacts 82 and the second electrical contacts. A retainment feature 86 is disposed on the housing 80 for maintaining an electrical connection between the first and second electrical contacts 82 when the electrical connector is coupled to the corresponding second electrical connector within the vehicle 10 (FIG. 1). Accordingly, the module 46 may include integrated wiring such that the wires do not contact any other components of the center portion 20 of the instrument panel 14 (FIG. 1). A configuration, as described herein, may minimize the risk of NVH issues once the vehicle 10 (FIG. 1) is assembled. Moreover, the integrated module 46 may reduce the assembly time of a cockpit module while the vehicle 10 (FIG. 1) is being assembled. Further, using the module 46 disclosed herein may minimize production costs.

The module 46 may also incorporate varying screen sizes within a standardized connection without having to alter any other components of the cockpit module. For example a first display 44 may extend a first distance above the instrument panel 14 (FIG. 1) while a second display 44 may extend a larger distance from the instrument panel 14 (FIG. 1). In both cases, the same retainers may be utilized in the same retainer pattern within the instrument panel substrate further reducing assembly times while having the opportunity for vehicle purchasers to customize the cockpit module of the vehicle 10 (FIG. 1).

Figure 9:
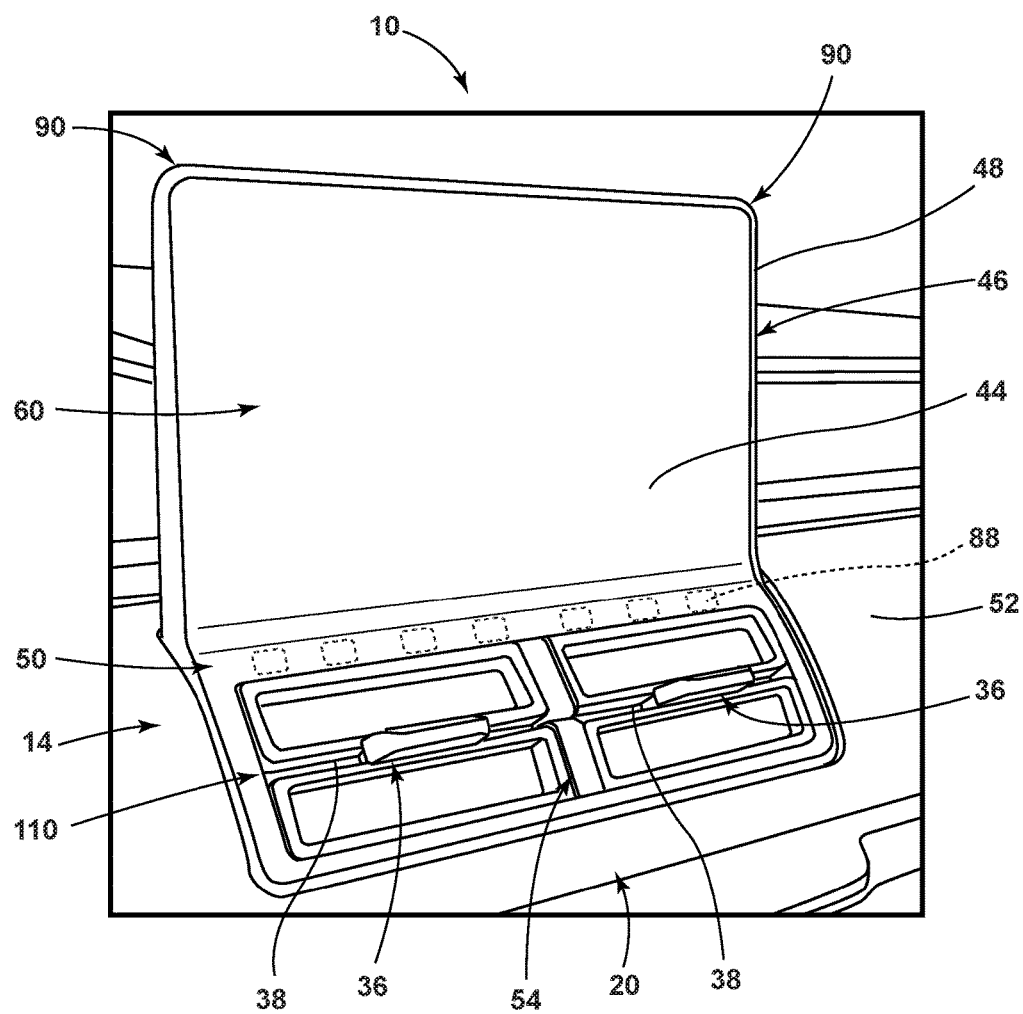
FIG. 9 is a front perspective view of a module disposed on a center portion of the instrument panel having one or more switches disposed thereon, according to one embodiment.

Referring to FIG. 9, the module 46 may also include one or more switches 88 or buttons, including hard keys or soft keys. According to one embodiment, the switches 88 may be located on the transition portion 50 of the module 46. The switches 88 may control any system, feature, or setting within the vehicle 10. According to one embodiment, the switches 88 may be configured as one or more proximity switches that sense the presence of an object in close proximity thereto. The object can be one or more fingers of the user. Moreover, the object can be any object suitable for activating the proximity switch (e.g., altering or disturbing the capacitive field). Further, the proximity switch can be configured to have adequate sensitivity to detect a single finger of the user, one or more fingers of the user that are covered by a glove, a child's one or more fingers, the like, or a combination thereof.

Accordingly, a module that integrally forms an upwardly extending display, a bezel, a transition portion 50, and one or more registers for a vehicle has been advantageously described herein. The integrally formed module provides various benefits including an efficient and cost-effective means to produce a center stack feature that may function as a distinct styling element that increases the refinement of a vehicle.

According to various embodiments, a vehicle instrument panel module is provided herein. The module includes a display portion including a display. A transition portion is disposed along a bottom section of the display portion. A register portion is disposed below the transition portion and has one or more airflow registers therein. The display portion, the transition portion, and the register portion each have at least one component that is integrally formed with the remaining portions of the module. A first electrical connector housing is formed with the module and configured to mate with a second electrical connector disposed within the vehicle. Embodiments of the vehicle instrument panel module can include any one and/or a combination of the following features:

- a first electrical connector housing formed with the module and configured to mate with a second electrical connector disposed within the vehicle;
- the one or more of the registers have a substantially rectangular housing and one or more vanes within the housing;
- wherein said vehicle instrument panel module is partially disposed within an instrument panel;
- said vehicle instrument panel module is coupled to an instrument panel substrate that is concealed by an A-surface material of an instrument panel;
- the display is configured as a light-emitting diode (LED) display, organic LED (OLED) display, light emitting polymer (LEP) display or polymer LED (PLED) display, liquid crystal display (LCD) display, thin film transistor (TFT) LCD display, LED side-lit or back-lit LCD display, or combinations thereof;
- a bezel surrounding the display portion, the transition portion, and the register portion and is made of a common material;
- the bezel further comprises: a first portion that encompasses the display that extends upwardly from an instrument panel; a second portion having a first radius, wherein the first radius has a curvature in a first direction; and a third portion having a second radius that has a curvature in a second direction, wherein the first, second, and third portions of the bezel are formed as an integral vehicle component;
- the second portion is radiused in a first direction that is opposite of a radiused direction of the third portion;
- the bezel covers one or more perimeter edges and vehicle forward surface of the display;
- a camera disposed within the display portion; and/or
- the transition portion is configured to support the display portion in a vertical orientation.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited, to physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:
1. A vehicle instrument panel module, comprising:
   a display portion including a display;

a transition portion disposed along a bottom section of the display portion;

a register portion disposed below the transition portion and having one or more airflow registers therein, wherein the register portion has at least one component that anchors the display and transition portions of the module; and a first electrical connector housing formed with the module and configured to mate with a second electrical connector disposed within the vehicle.

2. The vehicle instrument panel module of claim 1, wherein the one or more of the registers have a substantially rectangular housing and one or more vanes within the housing.

3. The vehicle instrument panel module of claim 1, wherein the vehicle instrument panel module is partially disposed within an instrument panel.

4. The vehicle instrument panel module of claim 1, wherein the vehicle instrument panel module is coupled to an instrument panel substrate that is concealed by an A-surface material of an instrument panel.

5. The vehicle instrument panel module of claim 1, wherein the display is configured as a light-emitting diode (LED) display, organic LED (OLED) display, light emitting polymer (LEP) display or polymer LED (PLED) display, liquid crystal display (LCD), thin film transistor (TFT) LCD display, LED side-lit or back-lit LCD display, or combinations thereof.

6. The vehicle instrument panel module of claim 1, wherein the transition portion is configured to support the display portion in a vertical orientation.

7. The vehicle instrument panel module of claim 1, further comprising:

a bezel surrounding the display portion, the transition portion, and the register portion and is made of a common material.

8. A bezel housing for a center stack module, comprising:

a first portion that encompasses a display that extends upwardly from an instrument panel;

a second portion having a first radius, wherein the first radius has a curvature in a first direction; and a third portion having a second radius that has a curvature in a second direction, wherein the first and second portions of said bezel housing are anchored to an instrument panel by the third portion.

9. The bezel housing for the center stack module of claim 8, wherein the second portion is radiused in a first direction that is opposite of a radiused direction of the third portion.

10. The bezel housing for the center stack module of claim 8, wherein said bezel housing covers one or more perimeter edges and vehicle forward surface of the display.

11. The bezel housing for the center stack module of claim 8, further comprising:

a camera disposed within the first portion.

12. The bezel housing for the center stack module of claim 8, wherein said bezel housing is of a two-piece construction and includes a perimeter portion and a front portion.

13. The bezel housing for the center stack module of claim 12, wherein the perimeter portion covers a vehicle forward surface of the display.

14. The bezel housing for the center stack module of claim 8, wherein the front portion faces vehicle rearward and is attached to a vehicle rearward surface of the module.

15. A module for a vehicle, comprising:

a display portion surrounding a portion of a display;

a transition portion disposed below the display portion; and a register portion disposed below the transition portion and including one or more airflow registers therein, wherein the display portion and the transition portion are anchored by the register portion.

16. The module for the vehicle of claim 15, further comprising:

a plurality of controls that is accessible to an occupant of the vehicle to adjust an option or setting of the vehicle, wherein the controls are utilized in conjunction with the display.

17. The module for the vehicle of claim 15, wherein the transition portion is radiused in a first direction that is opposite a radiused direction of the register portion.

18. The module for the vehicle of claim 15, wherein each register is provided with one or more horizontally oriented vanes and one or more vertically oriented vanes.

19. The module for the vehicle of claim 18, wherein the horizontally oriented vanes are mechanically coupled one to the other by a first linkage that connects to a register control tab and each of the vertically oriented vanes is mechanically coupled one to the other by a second linkage that connects to the control tab.

20. The module for the vehicle of claim 15, wherein the coupling of each register to an air duct provides support against a torsional force and a linear force that act against said module when contact is made thereto.

* * * * *